United States Patent
Rozint et al.

(10) Patent No.: US 11,961,341 B2
(45) Date of Patent: Apr. 16, 2024

(54) SYSTEMS AND METHODS FOR DETERMINING LIKELIHOOD OF INCIDENT RELATEDNESS FOR DIAGNOSTIC TROUBLE CODES

(71) Applicant: Mitchell International, Inc., San Diego, CA (US)

(72) Inventors: John J. Rozint, San Diego, CA (US); GeengYee Chong, San Diego, CA (US)

(73) Assignee: Mitchell International, Inc.

( * ) Notice: Subject to any disclaimer, the term of this patent is extended or adjusted under 35 U.S.C. 154(b) by 377 days.

(21) Appl. No.: 16/922,927

(22) Filed: Jul. 7, 2020

(65) Prior Publication Data
US 2020/0334927 A1     Oct. 22, 2020

Related U.S. Application Data

(63) Continuation-in-part of application No. 15/487,379, filed on Apr. 13, 2017, now Pat. No. 10,152,836.
(Continued)

(51) Int. Cl.
*G07C 5/08* (2006.01)
*B60R 21/0136* (2006.01)
(Continued)

(52) U.S. Cl.
CPC ........ *G07C 5/0808* (2013.01); *B60R 21/0136* (2013.01); *G06Q 10/20* (2013.01); *G07C 5/008* (2013.01); *G07C 5/0841* (2013.01)

(58) Field of Classification Search
None
See application file for complete search history.

(56) References Cited

U.S. PATENT DOCUMENTS

| 5,446,659 A | 8/1995 | Yamawaki |
| 6,370,454 B1 | 4/2002 | Moore |

(Continued)

FOREIGN PATENT DOCUMENTS

| CN | 102098326 | 6/2011 |
| CN | 102736615 A | 10/2012 |

(Continued)

OTHER PUBLICATIONS

Office Action in Canadian Patent Application No. 3092411, dated Sep. 1, 2021.
(Continued)

*Primary Examiner* — Thomas E Worden
(74) *Attorney, Agent, or Firm* — Sheppard Mullin Richter & Hampton LLP

(57) ABSTRACT

A new automotive collision repair technology is provided, including system and data flow architectures that are designed to provide enhanced data and enhanced data flow in the context of vehicle diagnosis and repair, particularly when repairs are necessary due to collisions. In some examples, the data flow through the network is streamlined, to avoid network congestion, to use fewer computer and network resources and/or to enable the utilization of smaller databases. In other examples, enhanced access to data in real-time and near real-time enabled by a workflow module supports more accurate and timely decisions on vehicle repair. An advantage of this new automotive collision repair technology is that it enables a determination of relatedness likelihood of individual DTC, which in turn decreases costs and increases savings.

12 Claims, 8 Drawing Sheets

Related U.S. Application Data

(60) Provisional application No. 62/324,826, filed on Apr. 19, 2016.

(51) Int. Cl.
*G06Q 10/20* (2023.01)
*G07C 5/00* (2006.01)

(56) References Cited

U.S. PATENT DOCUMENTS

| | | | |
|---|---|---|---|
| 6,381,561 B1 | 4/2002 | Bomar, Jr. et al. | |
| 6,650,949 B1 | 11/2003 | Fera | |
| 6,885,981 B2 | 4/2005 | Bomar, Jr. et al. | |
| 6,959,235 B1 | 10/2005 | Abdel-Malek | |
| 7,197,444 B2 | 3/2007 | Bomar, Jr. et al. | |
| 7,502,772 B2 | 3/2009 | Kidd et al. | |
| 7,698,086 B2 | 4/2010 | Kidd et al. | |
| 8,019,629 B1 | 9/2011 | Medina, III et al. | |
| 8,160,904 B1 | 4/2012 | Smith | |
| 8,260,639 B1 | 9/2012 | Medina, III et al. | |
| 8,346,411 B1 | 1/2013 | Dirks | |
| 8,612,170 B2 | 12/2013 | Smith et al. | |
| 8,712,806 B1 | 4/2014 | Medina, III et al. | |
| 9,019,092 B1 | 4/2015 | Brandmaier et al. | |
| 9,218,626 B1 | 12/2015 | Haller, Jr. et al. | |
| 9,500,545 B2 | 11/2016 | Smith et al. | |
| 9,582,943 B1 | 2/2017 | Morrison et al. | |
| 9,715,711 B1 | 7/2017 | Konrardy | |
| 9,721,400 B1 | 8/2017 | Oakes, III et al. | |
| 9,773,281 B1 | 9/2017 | Hanson | |
| 9,846,093 B2 | 12/2017 | Smith | |
| 10,024,684 B2 | 7/2018 | Wang | |
| 10,152,836 B2 | 12/2018 | Rozint | |
| 10,319,035 B2 | 6/2019 | Nelson et al. | |
| 10,339,728 B1 | 7/2019 | Oakes, III et al. | |
| 10,360,601 B1 * | 7/2019 | Adegan | G06Q 30/0283 |
| 10,410,439 B1 | 9/2019 | Gingrich et al. | |
| 10,510,142 B1 | 12/2019 | Dohner et al. | |
| 10,922,726 B1 | 2/2021 | Nelson et al. | |
| 10,937,103 B1 * | 3/2021 | Marlow | G06Q 40/08 |
| 10,949,814 B1 | 3/2021 | Nelson et al. | |
| 11,062,534 B2 | 7/2021 | Jingle et al. | |
| 2002/0016655 A1 | 2/2002 | Joao | |
| 2002/0077779 A1 | 6/2002 | Liebl et al. | |
| 2002/0138185 A1 | 9/2002 | Trsar | |
| 2004/0112124 A1 | 6/2004 | Sonnenrein et al. | |
| 2004/0230498 A1 | 11/2004 | Zimmerman | |
| 2005/0021197 A1 | 1/2005 | Zimmerman | |
| 2005/0143882 A1 | 6/2005 | Umezawa | |
| 2006/0101311 A1 | 5/2006 | Lipscomb et al. | |
| 2006/0271246 A1 | 11/2006 | Bell | |
| 2007/0032207 A1 | 2/2007 | Shah et al. | |
| 2007/0050105 A1 | 3/2007 | Chinnadurai et al. | |
| 2007/0050106 A1 | 3/2007 | Chinnadurai | |
| 2007/0100520 A1 | 5/2007 | Shah et al. | |
| 2007/0173993 A1 | 7/2007 | Nielsen | |
| 2007/0202857 A1 | 8/2007 | Hara | |
| 2008/0004764 A1 | 1/2008 | Chinnadurai | |
| 2008/0103652 A1 | 5/2008 | Mcgee et al. | |
| 2008/0103653 A1 | 5/2008 | Raichle et al. | |
| 2008/0208403 A1 | 8/2008 | Bertosa et al. | |
| 2008/0250196 A1 | 10/2008 | Mori | |
| 2008/0319665 A1 | 12/2008 | Berkobin | |
| 2009/0265057 A1 | 10/2009 | Chinnadurai et al. | |
| 2010/0256863 A1 | 10/2010 | Nielsen | |
| 2010/0318258 A1 | 12/2010 | Katayama | |
| 2010/0324376 A1 | 12/2010 | Chinnadurai | |
| 2011/0035096 A1 | 2/2011 | Liebl et al. | |
| 2011/0130906 A1 | 6/2011 | Mayer | |
| 2011/0130916 A1 | 6/2011 | Mayer | |
| 2011/0246018 A1 | 10/2011 | Bertosa et al. | |
| 2012/0021386 A1 | 1/2012 | Anderson | |
| 2012/0029759 A1 | 2/2012 | Suh | |
| 2012/0041637 A1 | 2/2012 | Allemang | |
| 2012/0324075 A1 | 12/2012 | Bertosa et al. | |
| 2013/0268156 A1 | 10/2013 | Schumann | |
| 2013/0282228 A1 | 10/2013 | Cawse | |
| 2013/0304306 A1 | 11/2013 | Selkirk et al. | |
| 2013/0332004 A1 | 12/2013 | Gompert | |
| 2014/0074343 A1 | 3/2014 | Fish et al. | |
| 2014/0122130 A1 | 5/2014 | Kelly et al. | |
| 2014/0188433 A1 | 7/2014 | Erath et al. | |
| 2015/0039176 A1 | 2/2015 | Fish | |
| 2015/0039177 A1 | 2/2015 | Chapman | |
| 2015/0039397 A1 | 2/2015 | Fuchs | |
| 2015/0317243 A1 | 11/2015 | Green | |
| 2015/0317739 A1 | 11/2015 | Lawlor et al. | |
| 2015/0371458 A1 | 12/2015 | Scott | |
| 2016/0049018 A1 | 2/2016 | Gro | |
| 2016/0063776 A1 | 3/2016 | Chronowski | |
| 2016/0071333 A1 | 3/2016 | Haidar | |
| 2016/0071338 A1 | 3/2016 | Mcquade et al. | |
| 2016/0078695 A1 | 3/2016 | McClintic | |
| 2016/0086397 A1 | 3/2016 | Phillips | |
| 2016/0110934 A1 | 4/2016 | Ernst | |
| 2016/0171802 A1 | 6/2016 | Fountain | |
| 2016/0178465 A1 | 6/2016 | Smith et al. | |
| 2016/0257415 A1 | 9/2016 | Ye | |
| 2016/0300402 A1 | 10/2016 | Nassar | |
| 2016/0314627 A1 | 10/2016 | Fish et al. | |
| 2016/0328890 A1 | 11/2016 | Keane | |
| 2016/0330284 A1 | 11/2016 | Holck | |
| 2016/0335816 A1 | 11/2016 | Thoppae et al. | |
| 2017/0041737 A1 | 2/2017 | Fischer | |
| 2017/0053460 A1 | 2/2017 | Hauser | |
| 2017/0069144 A1 | 3/2017 | Lawrie-Fussey | |
| 2017/0148102 A1 | 5/2017 | Franke et al. | |
| 2017/0177757 A1 | 6/2017 | Thorley et al. | |
| 2017/0193576 A1 | 7/2017 | Fish | |
| 2017/0200327 A1 | 7/2017 | Hokenmaier et al. | |
| 2017/0200359 A1 | 7/2017 | Gregg | |
| 2017/0301154 A1 | 10/2017 | Rozint | |
| 2017/0344958 A1 | 11/2017 | Lumera et al. | |
| 2018/0101775 A1 * | 4/2018 | Fish | G06F 16/248 |
| 2018/0225341 A1 | 8/2018 | Merg | |
| 2018/0293813 A1 | 10/2018 | Rozint | |
| 2018/0300576 A1 | 10/2018 | Dalyac | |
| 2020/0223385 A1 * | 7/2020 | Brozovich | G07C 5/008 |
| 2020/0334927 A1 | 10/2020 | Rozint | |
| 2021/0097503 A1 | 4/2021 | Rozint | |
| 2021/0110480 A1 * | 4/2021 | Kwak | G07C 5/008 |
| 2023/0035340 A1 * | 2/2023 | Rose | G08G 1/0133 |
| 2023/0083255 A1 * | 3/2023 | Ebrahimi | G07C 5/0808 |

FOREIGN PATENT DOCUMENTS

| | | |
|---|---|---|
| WO | 2017/174245 A1 | 10/2017 |
| WO | WO 2017184715 A1 | 10/2017 |

OTHER PUBLICATIONS

BOSCH, OTC Encore at a Glance, Brochure, Feb. 2017, 17 pages.
BOSCH, OTC Diagnostics for Life, Brochure, 2017, 2 pages.
BOSCH, OTC Introducing OTC 3896 Evolve Powered by Bosch, Brochure, 2017, 4 pages.
Maxisys, Vehicle Diagnostic Report, Jun. 2017, 4 pages.
Air Pro Diagnostics, website found at URL: www.airprodiagnostics.com, retrieved Jan. 19, 2023, 1 page.
Notification of Transmittal of the International Search Report and the Written Opinion of the International Searching Authority, or the Declaration, for International Application No. PCT/US2017/028341 dated Aug. 29, 2017.

* cited by examiner

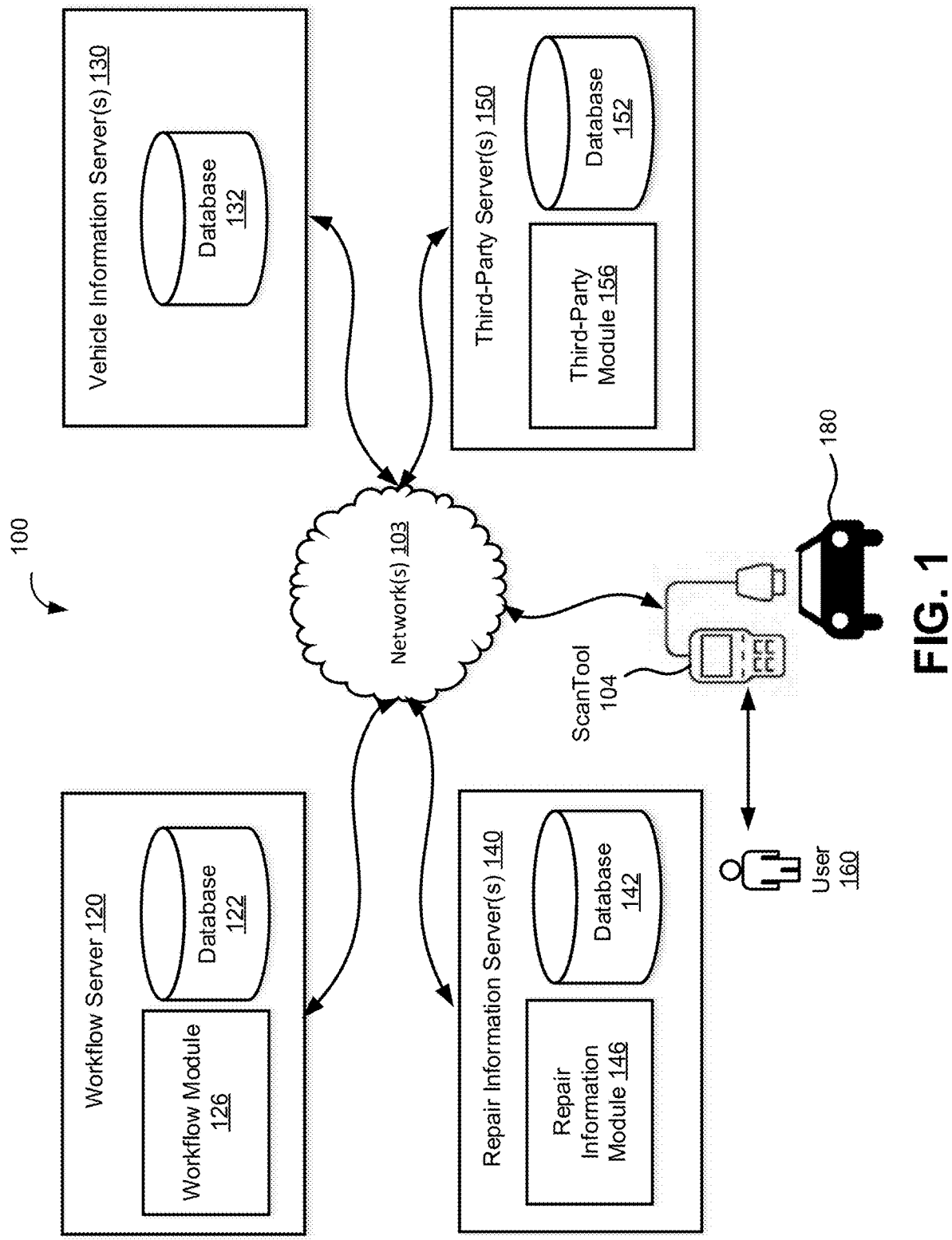

SYSTEMS AND METHODS FOR DETERMINING LIKELIHOOD OF INCIDENT RELATEDNESS FOR DIAGNOSTIC TROUBLE CODES

RELATED APPLICATIONS

This application a continuation-in-part of U.S. patent application Ser. No. 15/487,379, filed on Oct. 19, 2017, which claims the benefit of U.S. Provisional Application No. 62/324,826 filed on Apr. 19, 2016, the contents of which are incorporated herein by reference in its entirety.

TECHNICAL FIELD

The present disclosure is generally related to automobiles. More particularly, the present disclosure is directed to automotive collision repair technology.

BACKGROUND

All vehicles include on-board diagnostic (OBD) systems which provide a vehicle owner or a repair technician with access to the status of various vehicle sub-systems. Most OBD implementations use a standardized digital communication port to provide real-time data in addition to a standardized series of diagnostic trouble codes, or DTCs, which allow the technician to identify and repair malfunctions within the vehicle. OBD systems have become increasingly more important, as vehicles are becoming increasingly computerized, and often rely on software to repair many problems and ensure safe vehicle performance.

Often, repairing a vehicle involved in a collision event may require resetting, replacement, and/or reprogramming of multiple systems or sub-systems and their associated DTCs. For example, because airbag systems may be connected to seat weight sensors, replacing airbags may necessitate recalibrating the seat weight sensors. Similarly, blind spot cameras, embedded in side view mirrors, may have to be recalibrated or replaced, upon replacing the side view mirrors.

The proliferation of interconnected computerized and automated vehicle systems leverages diagnostic scan tools and equipment for processing and exchange of diagnostic repair data, repair procedure data, often in real time, in order to correctly and safely return collision damaged vehicles to their pre-accident function. Accordingly, diagnostic information collected using a diagnostic scan tool is an integral part of any repair process. For example, diagnostic repair data collected by a repair technician during the repair process may be used to provide details as to which vehicle system was accessed and repaired during the repair process as proof that the vehicle was repaired properly and returned to its pre-accident condition.

Unfortunately, relying on the diagnostic scan tool data alone is not sufficient when attempting to obtain a confirmation that not only all the necessary repairs were executed but that the repairs were executed correctly. Accordingly, existing diagnostic scan tools are not capable of solving the problems and/or meeting the needs outlined above, efficiently and reliably. Therefore, a need exists for a novel diagnostic tool, systems and methods that enable the collision repair technician to repair the vehicle correctly and to document which systems were accessed during repairs as confirmation of successful repairs.

SUMMARY

In accordance with one or more embodiments, various features and functionality can be provided for using vehicle diagnostic information displayed via a computing device configured to function as a scanning tool during a collision repair process.

In some embodiments, a method for determining determine whether the diagnostic trouble code (DTC) is related to the collision event may receive at least one repair DTC, the DTC specifying diagnostic information related to a component in a vehicle, which may comprise one or more data inputs generated by the vehicle component. In some embodiments, one or more data inputs comprises a DTC date and time information, a DTC vehicle mileage information, a number of DTC key cycles, a location of the vehicle component, a DTC type.

In some embodiments, the method may determine whether the DTC is related to the collision event based on the a lookup on a database by vehicle make/model that stores those DTC types that are not caused by collision events. In some embodiments, when the DTC is determined to be definitely unrelated, the method may exclude the DTC from a repair estimate determination.

In some embodiments, the method may determine whether the DTC is related to the collision event by comparing the DTC date and time to a collision event date and time, comparing the DTC vehicle mileage to a collision event vehicle mileage, and comparing the number of DTC key cycles to the number of vehicle key cycles since the collision event.

In some embodiments, the method may determine that the DTC date and time information precedes the collision event date and time information, the DTC vehicle mileage information is less than the collision event vehicle mileage information, and the number of DTC key cycles is greater than the vehicle key cycles since the accident event.

In some embodiments, the method may determine whether the DTC is related to the collision event by comparing the location of the vehicle component reporting the DTC to a point of impact location associated with the collision event. In some embodiments, the method may determine whether the DTC type is consistent to one or more DTCs previously determined to be associated with the collision event.

In some embodiments, the method may determine that the DTC is likely unrelated when the location of the vehicle component reporting the DTC is determined to not be adjacent to the point of impact location associated with the collision event, and the DTC type is determined to be inconsistent with the one or more DTCs previously determined to be associated with the collision event.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

FIG. 1 illustrates example systems and a network environment, according to an implementation of the disclosure.

DETAILED DESCRIPTION

Figure 2A:
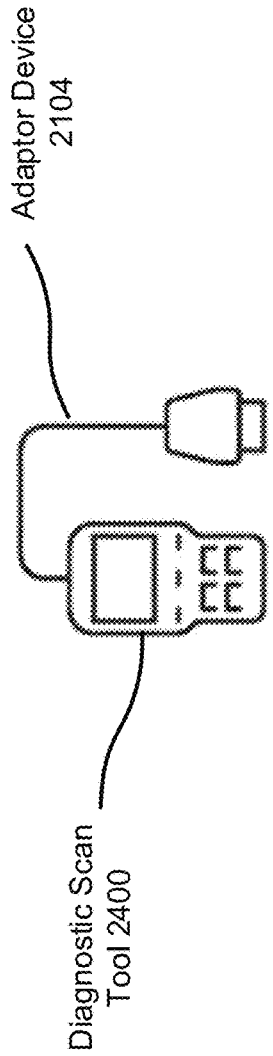
FIGS. 2A-2C illustrate an example diagnostic scan tool of the example environment of FIG. 1, according to an implementation of the disclosure.

Described herein are systems and methods for using vehicle diagnostic information displayed via a computing device configured to function as a scanning tool during a collision repair process. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, existing diagnostic scanning tools fail to provide confirmation not only that all the necessary repair steps were executed (i.e., by virtue of providing information which vehicle systems were accessed and reset or recalibrated during the repair process) but also that these repair steps were executed in accordance with repair procedures provided by the original equipment manufacturer (OEM).

Currently, one of the final steps of the repair process includes re-engagement and/or recalibration of various components and systems. For example, recalibration of safety systems (which include lane departure and blind spot monitoring system) may be required. However, using diagnostic trouble codes (DTCs) obtained from the diagnostic scanning tool alone may not provide confirmation that the safety systems were recalibrated. In particular, a DTC provides an indication that a certain component or system is reporting a problem. While a safety system may have a DTC before repairs commence, and may not have one when the repairs are complete. However, absence of a DTC alone does not provide that all systems are now functioning properly or that OEM repair procedures were accessed and followed during the repair process of the safety systems. Accordingly, current scan tools that only generate a DTC do not provide information that OEM repair procedures were followed and that the recalibration was performed successfully.

By enhancing the functionality of the diagnostic scanning tool, the present embodiments may utilize diagnostic status information recorded during various stages of vehicle repair to document repair operations as they become completed, record repair procedures referenced during the course of the repairs; and record time spent by a repair technician during the repair process. For example, diagnostic scan tools may capture diagnostic data and/or diagnostic reports related to the functional status of vehicle's electronic systems before and after the repairs ("pre-scan" and "post-scan"). In particular, the pre-scan diagnostic data may be used to identify issues that may exist with electronic/computerized systems and sub-systems, and sensors of a vehicle before the start of a repair process. Information collected during the pre-scan may include fault codes, communication errors, and other similar information indicating damaged control systems and sub-systems, modules, sensors, cameras, and other components of a vehicle. For example, pre-scan diagnostic data may assist in determining a vehicle's pre-repair condition, generating accurate damage assessment, and developing a repair cost estimate.

Similarly, the post-scan data may be used to record the functioning of various vehicles' systems and sub-systems after the repair procedures have been completed. That is, if the repair procedures were successful, the post-scan data may provide documentation that the vehicle has a clean electronics "report card", showing that all systems are returned to proper function. However, as alluded to earlier, existing methods do not utilize conventional scan tools to document that OEM repair procedures were adhered to during the repair, nor do they provide documentation of successful completion of safety system recalibration routines.

In accordance with various embodiments, the diagnostic scan tool may be configured to utilize diagnostic data collected during the pre- and post-scans to document not only that all the necessary repairs were completed, but also that they were completed correctly. For example, the pre-scan data may be utilized as evidence that only those repair procedures that were necessary were performed. Additionally, by virtue of providing a confirmation that the repair procedures were executed correctly, contributes to vehicle safety. Also, when safety systems require recalibration the diagnostic scan tool and related systems can be utilized to produce documentation proving that the safety systems are functioning as designed. Accordingly, by utilizing the data from both the pre-scan and the post-scan, result in a more streamlined documentation of the repair process.

Before describing the technology in detail, it is useful to describe an example environment in which the presently disclosed technology can be implemented. FIG. 1 illustrates one such example environment 100.

Environment

FIG. 1 illustrates an example network environment architecture 100 which provides enhanced data and enhanced data flow in the context of vehicle diagnosis and repair, particularly when determining whether repairs are necessary due to collisions. For example, data flow through the network is streamlined to avoid network congestion, to use fewer computer and network resources and/or to enable the utilization of smaller databases, as will be described in more detail hereinafter. In other examples, enhanced access to data in real-time and near real-time enabled by one or more components of environment 100 (e.g., the diagnostic information workflow module) supports more accurate and timely decisions on vehicle repair, billing, and claims processing, which in turn enables accurate repairs (i.e., repairs resulting in vehicle and/or passenger safety). Further, environment 100 enables improved repair facility billing processes, and streamlined claims processing.

In some embodiments, environment 100 may include a client computing device 104 (e.g., diagnostic scanning tool) configured to support vehicle 180 connectivity, a workflow server 120, a one or more vehicle information server(s) 130, a one or more repair information server(s) 140, a one or more third-party server(s) 150, and a network 103. A user 160 may be associated with client computing device 104 as described in detail below. Additionally, environment 100 may include other network devices such as one or more routers and/or switches.

In some embodiments, client computing device 104 may include a variety of electronic computing devices, for example, an onboard diagnostics (OBD) handheld scanner device, such as Original Equipment Manufacturer (OEM) scanner, after market (A/M) scanner, or any other tool configured to read diagnostic trouble codes (DTCs). In other embodiments, client computing device 104 may include other types of electronic computing devices, such as, for example, a smartphone, a tablet, a laptop, a virtual reality device, an augmented reality device, a display, a mobile phone, a computer wearable device, such as smart glasses, or any other head mounted display device, or a combination of any two or more of these data processing devices, and/or other devices.

As described above, diagnostic scan tool 104 may collect diagnostic data during pre- and post-scans performed by user 160 (e.g., a repair technician) of vehicle 180. In some embodiments, diagnostic scan tool 104 may communicate with workflow server 120 via network 103 and may be connected wirelessly or through a wired connection. For example, diagnostic scan tool 104 may transmit this diagnostic data to workflow module 126 of workflow server 120, as described in detail herein. Workflow module 126 may then use the data transmitted by scan tool 104 to document that all necessary repairs were completed and that they were completed correctly. Such documentation may contribute to vehicle safety, and reduces potential fraud since it provides evidence that repairs that were performed were actually needed or necessary, as previously explained.

Workflow Server

In some embodiments and as will be described in detail in FIG. 3, workflow server 120 may include a processor, a memory, and network communication capabilities. In some embodiments, workflow server 120 may be a hardware server. In some implementations, workflow server 120 may be provided in a virtualized environment, e.g., workflow server 120 may be a virtual machine that is executed on a hardware server that may include one or more other virtual machines. Additionally, in one or more embodiments of this technology, virtual machine(s) running on workflow server 120 may be managed or supervised by a hypervisor. Workflow server 120 may be communicatively coupled to a network 103.

In some embodiments, the memory of workflow server 120 may store application(s) that can include executable instructions that, when executed by workflow server 120, cause workflow server 120 to perform actions or other operations as described and illustrated below with reference to FIG. 3. For example, workflow server 120 may include workflow module 126. In some embodiments, workflow module 126 may be a distributed application implemented on one or more diagnostic scan tools 104 as client workflow application (e.g., workflow application 2421 running on diagnostic scan tool 2400 illustrated in FIG. 2C). In some embodiments, distributed workflow module 126 may be implemented using a combination of hardware and software. In some embodiments, workflow module 126 may be a server application, a server module of a client-server application, or a distributed application.

The application(s) can be implemented as modules, engines, or components of other application(s). Further, the application(s) can be implemented as operating system extensions, module, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application(s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

In some embodiments, workflow server 120 can be a standalone device or integrated with one or more other devices or apparatuses, such as one or more of the storage devices, for example. For example, workflow server 120 may include or be hosted by one of the storage devices, and other arrangements are also possible.

In some embodiments, workflow server 120 may transmit and receive information to and from diagnostic scan tool 104, one or more vehicle information servers 130, one or more repair information servers 140, one or more third-party servers 150, and/or other servers via network 103. For example, a communication interface of the workflow server 120 may be configured to operatively couple and communicate between diagnostic scan tool 104, vehicle information server 130, repair information server 140, and third-party server 150, which are all coupled together by the communication network(s) 103.

Vehicle Info Server

In some embodiments, vehicle information server 130 may be configured to store and manage vehicle information associated with a damaged vehicle. For example, vehicle information may include vehicle identification information, such as vehicle Information Number (VIN), make, model, and optional modifications (e.g., sub-model and trim level), date and place of manufacture, and similar information related to a damaged vehicle. The vehicle information server 130 may include any type of computing device that can be used to interface with workflow server 120, repair procedure server 140, third-party server 150, and diagnostic scan tool 104. For example, vehicle information server 130 may include a processor, a memory, and a communication interface, which are coupled together by a bus or other communication link, although other numbers and/or types of network devices could be used. In some embodiments, vehicle information server 130 may also include a database 132. For example, database 132 may include a plurality databases configured to store content data associated with vehicle information, as indicated above. Vehicle information server 130 may run interface applications, such as standard web browsers or standalone client applications, which may provide an interface to communicate with the repair management computing device via the communication network(s). In some embodiments, vehicle information server 130 may further include a display device, such as a display screen or touchscreen, and/or an input device, such as a keyboard, for example.

Repair Info Server

In some embodiments, repair information server 140 may be configured to store and manage data related to information associated with repair procedures. Repair information server 140 may include processor(s), a memory, and a communication interface, which are coupled together by a bus or other communication link, although other numbers and/or types of network devices could be used. In some embodiments, repair information server 140 may also include a database 142. For example, database 142 may include a plurality databases configured to store content data associated with repair procedures (e.g., workflow repair procedures, including textual information, images, videos, with and without an audio guide, and/or animations, including 3D animations) demonstrating how to perform repairs of various parts for a variety of different types and models of vehicles. Additionally, database 432 may include sensor calibration documentation data, and other similar information.

In some embodiments, repair information server 140 may include any type of computing device that can be used to interface with the workflow server 120 to efficiently optimize the collision repair process. For example, repair information server 140 may include a processor, a memory, and a communication interface, which are coupled together by a bus or other communication link, although other numbers and/or types of network devices could be used.

In some embodiments, repair information server 140 may also include a database 142. For example, database 142 may include a plurality of databases configured to store content data associated with repair procedures, as indicated above. For example, database 142 of repair information server 140 may include information related to repair standards (e.g., safety standards or manufacturer standards). The content data associated with repair procedures may be encoded and arranged in accordance with a file type specification comprising a particular set of rules, each type of file (text, image, video, audio, and so on) having an associated set of rules.

In some embodiments, repair information server 140 may run interface applications, such as standard web browsers or standalone client applications, which may provide an interface to communicate with the workflow server 120 via the communication network(s) 103. In some embodiments, repair information server 140 may further include a display device, such as a display screen or touchscreen, and/or an input device, such as a keyboard, for example.

In some embodiments, the memory of repair information server 140 may store application(s) that can include executable instructions that, when executed by repair information server 140, cause repair information server 140 to perform actions or other operations. For example, repair information server 140 may include repair information module 146. In some embodiments, repair information module 146 may be a distributed application implemented on one or more diagnostic scan tools 104 as client workflow application (e.g., repair information module 2417 running on diagnostic scan tool 2400 illustrated in FIG. 2C). In some embodiments, distributed repair information module 146 may be implemented using a combination of hardware and software. In some embodiments, repair information module 146 may be a server application, a server module of a client-server application, or a distributed application.

Third-Party Server

In some embodiments, third-party information server 150 may be configured to store and manage information associated with one or more insurance carrier or other similar entity with respect to a damage incident (e.g., a collision accident). For example, the data associated with an insurance carrier may include a claim number which was assigned by the insurance carrier upon submitting an insurance claim reporting a damage incident, information related to the insurance carrier, the owner of the damaged vehicle, the vehicle, the damage reported during claim submission for adjustment, policy information, deductible amount, and other similar data.

Third-party information server 150 may include processor(s), a memory, and a communication interface, which are coupled together by a bus or other communication link, although other numbers and/or types of network devices could be used. In some embodiments, third-party information server 150 may also include a database 152. For example, database 152 may include a plurality of databases configured to store content data associated with insurance carrier policy and claim, as indicated above.

System Architecture

In some embodiments, workflow server 120, vehicle information server 130, repair information server 140, and third-party server 150 may be a single device. Alternatively, in some embodiments, vehicle information server 130, repair information servers 140, and third-party server 150 may include a plurality of devices. For example, the plurality of devices associated with workflow server 120, vehicle information server 130, repair information server 140, and third-party server 150 may be distributed across one or more distinct network computing devices that together comprise one or more workflow server 120, vehicle information server 130, repair information server 140, and third-party server 150.

In some embodiments, workflow server 120, vehicle information server 130, repair information server 140, and third-party server 150 may not be limited to a particular configuration. Thus, in some embodiments, workflow server 120, vehicle information server 130, repair information server 140, and third-party server 150 may contain a plurality of network devices that operate using a master/slave approach, whereby one of the network devices operate to manage and/or otherwise coordinate operations of the other network devices. Additionally, in some embodiments, workflow server 120, vehicle information server 130, repair information server 140, and third-party server 150 may comprise different types of data at different locations.

In some embodiments, workflow server 120, vehicle information server 130, repair information server 140, and third-party server 150 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with diagnostic scan tool 104, workflow server 120, vehicle information server 130, repair information server 140, third-party information server 150, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as diagnostic scan tool 104, workflow server 120, vehicle information server 130, repair information server 140, and/or third-party information server 150 may be configured to operate as virtual instances on the same physical machine. In other words, one or more of diagnostic scan tool 104, workflow server 120, repair information server 140, and/or third-party information server 150, may operate on the same physical device rather than as separate devices communicating through communication network(s). Additionally, there may be more or fewer devices than diagnostic scan tool 104, workflow server 120, vehicle information server 130, repair information server 140, and/or third-party information server 150.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Diagnostic Scan Tool

In some embodiments, client computing device 104 may include a diagnostic scan tool designed or adapted to specifically support the collision repair process as described herein. For example, as illustrated in FIG. 2A, diagnostic scan tool 2400 may be used to display DTCs generated by OBD systems.

In some embodiments, diagnostic scan tool 2400 may include an adaptor device 2104 (e.g., a "dongle") configured to support vehicle connectivity. Alternatively, diagnostic scan tool 2400 may be a laptop, a tablet, or smartphone. If enhanced as described herein, diagnostic scan tool 2400 may operate using a variety of computer devices and can use the industry standard hardware platforms of these devices (e.g., processor 2402 illustrated in FIG. 2B).

In some embodiments, the diagnostic scan tool 2400 may be a stand-alone tool. For example, diagnostic scan tool 2400 may be a proprietary tool that is designed and built specifically for the purpose of functioning within environment 100 (illustrated in FIG. 1) described herein. Alternatively, diagnostic scan tool 2400 may be an existing tool that is programmed, integrated, or otherwise modified to perform any of the functions described herein.

Figure 2B:
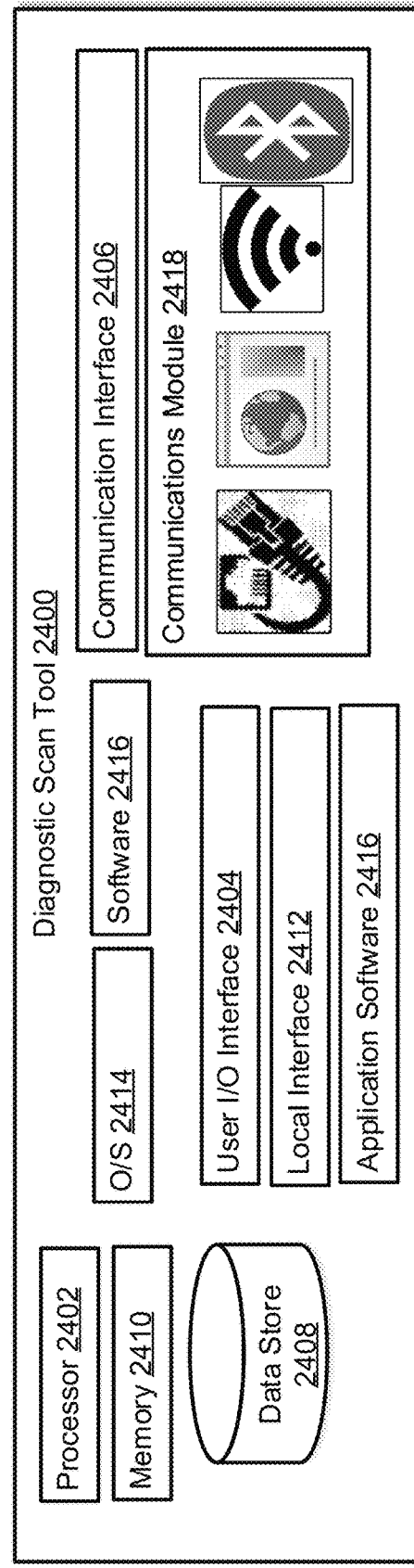

As illustrated in FIG. 2B, diagnostic scan tool 2400 may include a processor 2402, input/output (I/O) interfaces 2404 (e.g., a display and a keyboard), a radio interface 2406, a data store 2408, a memory 2410, and a local communication interface 2412 (e.g., an interface for connecting with an automotive vehicle). It should be appreciated by those of ordinary skill in the art that FIG. 2B depicts diagnostic scanning tool 2400 in an oversimplified manner, and a practical embodiment may include additional components and suitably configured processing logic to support known or conventional operating features that are not described in detail herein. The components (e.g., processor 2402, I/O interfaces 2404, radio interface 2406, data store 2408, and memory 2410) of scanning tool 2400 may be communicatively coupled via a local interface 2412.

In some embodiments, local interface 2412 me be one or more buses or other wired or wireless connections, as is known in the art. Local interface 2412 may have additional elements, which are omitted for simplicity, such as controllers, buffers (caches), drivers, repeaters, and receivers, among many others, to enable communications. Further, local interface 2412 may include address, control, and/or data connections to enable appropriate communications among the aforementioned components.

In some embodiments, processor 2402 may be a hardware device for executing software instructions. For example, processor 2402 may be any custom made or commercially available processor, a central processing unit (CPU), an auxiliary processor among several processors associated with the diagnostic scan tool 2400, a semiconductor-based microprocessor (in the form of a microchip or chip set), or generally any device for executing software instructions. When the diagnostic scan tool 2400 is in operation, processor 2402 may be configured to execute instructions (e.g., software instructions) stored within memory 2410, to communicate data to and from memory 2410, and to generally control operations of diagnostic scan tool 2400 pursuant to the software instructions. In some embodiments, processor 2402 may include a mobile optimized processor such as optimized for power consumption and mobile applications.

In some embodiments, I/O Interfaces 2404 can be used for receiving user input from and/or for providing system output. User input may be provided via external devices such as a keypad, a touch screen, a scroll ball, a scroll bar, buttons, bar code scanner, and the like.

In some embodiments, I/O Interfaces 2404 may include an adapter or vehicle interface for connecting to a vehicle computer, for running diagnostics, reprogram or reset modules. System output can be provided via a display device, such as a liquid crystal display (LCD), touch screen, and the like. In some embodiments, I/O Interfaces 2404 may also include, for example, a serial port, a parallel port, a small computer system Interface (SCSI), an infrared (IR) Interface, a radio frequency (RF) Interface, a universal serial bus (USB) Interface, and the like. In some embodiments, I/O Interfaces 2404 may include a graphical user Interface (GUI) that enables a user to interact with the diagnostic scan tool 2400. Additionally, I/O Interfaces 2404 may further include an imaging device, such as a camera, video camera, and similar imaging devices.

In some embodiments, communication interface 2406 of diagnostic scan tool 2400 may enable wireless communication to an external access device or network using any number of suitable wireless data communication protocols, techniques, or methodologies (e.g., as provided by a communication module 2418). For example, communication interface 2406 may support protocols such as RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

In some embodiments, data store 2408 may be used to store data within diagnostic scan tool 2400. For example, data store 2408 may include any of volatile memory elements (e.g., random access memory (RAM), such as DRAM, SRAM, SDRAM, and the like), nonvolatile memory elements (e.g., ROM, hard drive, tape, CDROM, and the like), and combinations thereof. In some embodiments, data store 2408 may incorporate electronic, magnetic, optical, and/or other types of storage media.

In some embodiments, memory 2410 of diagnostic scan tool 2400 may include any of volatile memory elements (e.g., random access memory (RAM), such as DRAM, SRAM, SDRAM, etc.), nonvolatile memory elements (e.g., ROM, hard drive, etc.), and combinations thereof. Moreover, memory 2410 may incorporate electronic, magnetic, optical, and/or other types of storage media. In some embodiments, memory 2410 may have a distributed architecture, where various components are situated remotely from one another, but can be accessed by processor 2402. In some embodiments, computer instructions stored in memory 2410 may include one or more software programs, each of which includes an ordered listing of executable instructions for implementing logical functions.

In some embodiments, software stored in memory 2410 of diagnostic scan tool 2400 may include a suitable operating system (O/S) 2414 and software applications 2416. For example, operating system 2414 may be configured to control the execution of other computer programs, and provide scheduling, input-output control, file and data management, memory management, and communication control and related services.

Figure 2C:
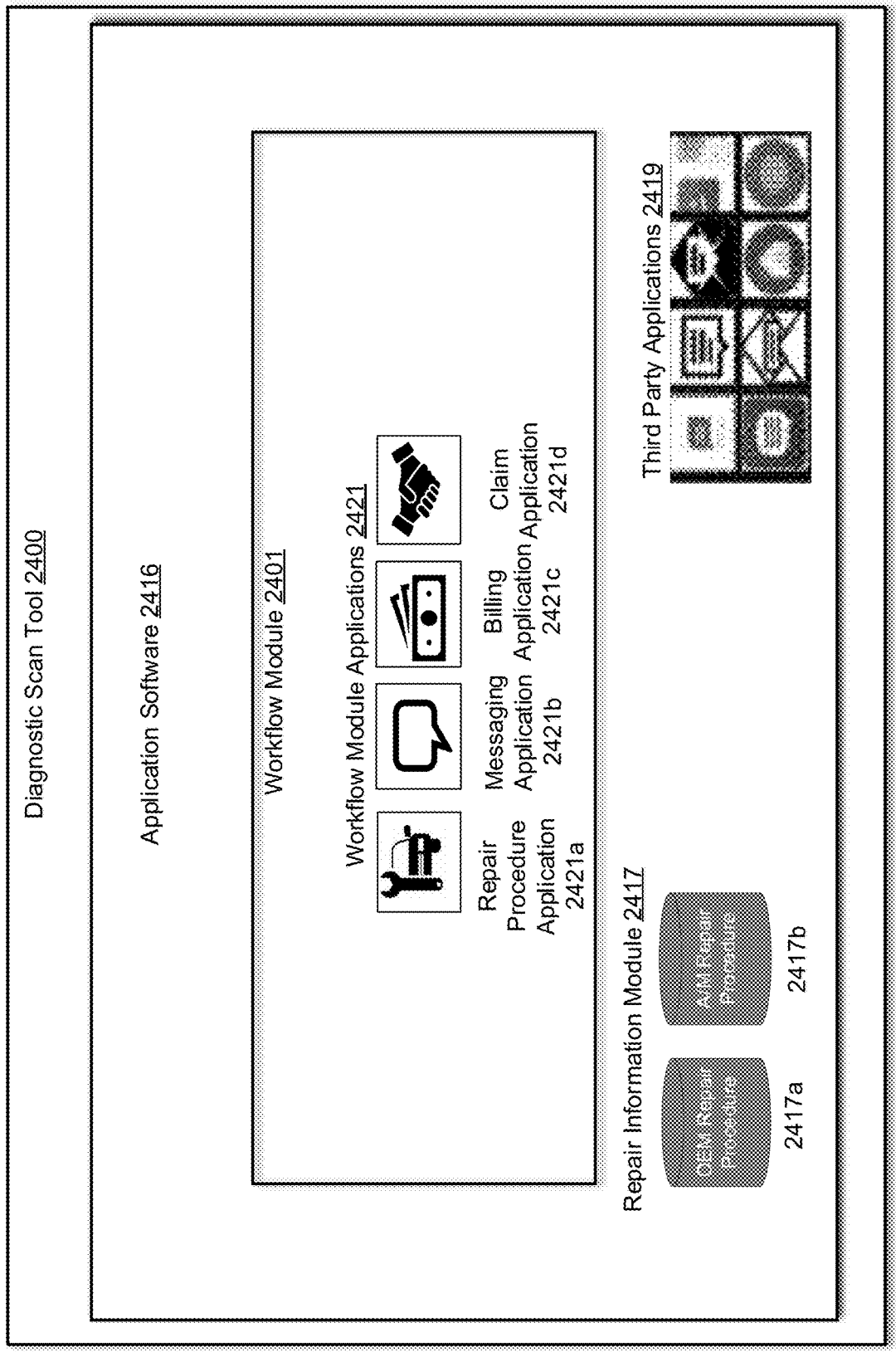

As illustrated in FIG. 2C, software applications 2416 may include various applications, add-ons, and so on, configured to provide end user functionality with scanning tool 2400. For example, software applications 2416 may include workflow applications 2421, third-party applications 2419, and repair application(s) 2417. The end user may use one or more of software applications 2416 within network 100 illustrated in FIG. 1.

As alluded to above, diagnostic scan tool 2400 may be a new or an enhanced existing automotive diagnostic scan tool configured to support collision repair process, as described herein. In some embodiments, workflow applications 2421 may be configured to enable interaction between diagnostic scan tool 2400 and workflow module 126 (illustrated in FIG. 1), as described in more detail hereinafter.

In some embodiments, diagnostic scan tool 2400 may be configured to include third-party applications 2419. For example, third-party applications 2419 may include applications for insurance carrier claims processing, production scheduling, car rental, fleet management, third party administration, independent appraiser, and so on. In some embodiments, third-party applications 2419 may be configured to enable interaction between diagnostic scan tool 2400 and third-party module 156 (illustrated in FIG. 1), as described in more detail hereinafter.

In some embodiments, diagnostic scan tool 2400 may be configured to include a repair information application 2417. For example, repair information application 2417 may include which may include databases 2417*a*, 2417*b* for storing OEM (Original Equipment Manufacturer) and/or A/M (after market) repair procedure information, notes and/or other information from a service writer or production manager. In some embodiments, repair procedure information may be received from workflow module 126 (illustrated in FIG. 1) or workflow applications 2421. For example, repair procedure information may include repair procedures to repair particular damage in a particular vehicle (e.g., based on make and model associated with a scanned VIN number). In some embodiments, repair procedures may be viewable on a display associated with diagnostic scan tool 2400 by a repairing technician performing the repairs, using a repair procedure application 2421*a*. The Repair Procedure Data may include audio and/or visual (e.g., images, videos) instructions or guides on how to repair or replace the specific part for the particular vehicle that needs repair.

As explained above, the diagnostic scan tool 2400 may be enhanced to include one or more workflow applications 2421 providing user (e.g., repair technician) operating diagnostic scan tool 2400 with functionalities configured to optimize the collision repair process. In some embodiments, user interfaces ("UI") 2404 (illustrated in FIG. 2B), may allow the technician to receive and send data, including receiving OEM and A/M Repair Procedure Data and/or notes to and from the service writer or production manager, through the workflow module 2401, using the workflow applications 2421. In some embodiments, the repair technician may receive claim data from the workflow module 2101 using the claim application 2421*d*, receive or send repair order data (such as technician assignments, technician repair log data, technician's hourly rates, including flat rate requirements, repair notes, etc.) using a workflow application 2421*a* or a billing application 2421*c*, and other data relevant to the vehicle, the repair order and the insurance claim being processed. In some embodiments, a messaging application 2421*b* (e.g., SMS) may be provided to enable technician's communication directly from the workflow applications module 2421 with repair facility personnel, insurer adjuster, car owner, car manufacturer, parts providers, and so on.

As alluded to above, diagnostic scan tool 2400, in addition to having repair process enhancing features described herein (e.g., applications 2417, 2421, and 2418), may contain other features and functions of a standard A/M scan tool or OEM scan tool, including obtaining or retrieving diagnostic data, reprogramming or resetting vehicles systems, sub-subsystems, and/or modules, and other similar functions configured to function with vehicles by multiple manufacturers.

Proof of Repairs

Referring back to FIG. 1, diagnostic scan tool 104 may capture diagnostic reports related to the functional status of vehicle's electronic systems before and after the repairs ("pre-scan" and "post-scan"), as explained earlier. For example, diagnostic scan tool 104 may be connected to vehicle 180 computer before the start of repairs in order to perform the Pre-Scan and diagnostic scan. During the Pre-Scan or upon its completion, diagnostic tool 104 may be configured to transfer data obtained from vehicle 180 to workflow module 126.

Typically, the tool would be disconnected upon starting the repair process. However, by reconnecting diagnostic scan tool 104 during the repair process may allow diagnostic repair tool 104 to capture the calibrations, resets, reprogramming, and/or other similar functions performed by the technician. For example, upon replacing an airbag sensor and putting the bumper back on vehicle 180, the technician may use scan tool 104 to reset the airbag sensor fault code. In another example, in some repair scenarios, the technician would have to recalibrate sensors, e.g., upon removing the passenger seat, the seat weight sensor used to prevent airbag deployment if a child is in the seat, may need to be recalibrated. The repair log data captured by scan tool 104 may be transferred to the workflow module 126 and utilized to enhance the repair process. For example, currently, the repair shop is unable to prove whether they recalibrated the seat weight sensor if, even if takes significant effort, resulting in the insurance carrier refusing to cover the costs, unless the repair shop takes the car to the dealership. By virtue of connecting scan tool 104 during the repair window, capturing the repair log data and transferring it to workflow module 126, including a date and time stamped work/repair log, allows workflow module 126 to generate a detailed work/repair log of all diagnostic repairs performed. Subsequently, this detailed repair log may be utilized as proof that that particular repair operations were performed. Such proof is especially relevant in the billing and insurance circumstances.

In other embodiments, by virtue of receiving diagnostic status information during multiple stages of vehicle repair from diagnostic scan tool 104, workflow module 126 may be configured to: (a) record the diagnostic status of a vehicle systems diagnostic scan before and after repairs (Pre-Scan and Post-Scan), or, optionally, even during repairs; (b) record repair operations completed by the technician during repairs (e.g., in the form of repair log data), for example, the replacement of a computerized vehicle module or the resetting of a module that has set a DTC; (c) record repair procedures referenced during the course of repairs; and (d) record the time spent by the technician during the repairs (based on the repair log data described hereinbefore).

Workflow Server

In some embodiments, the various below-described components of FIG. 3, including methods, and non-transitory computer readable media may be used for streamlining the processing of diagnostic and other data to optimize the collision repair process.

Figure 3:
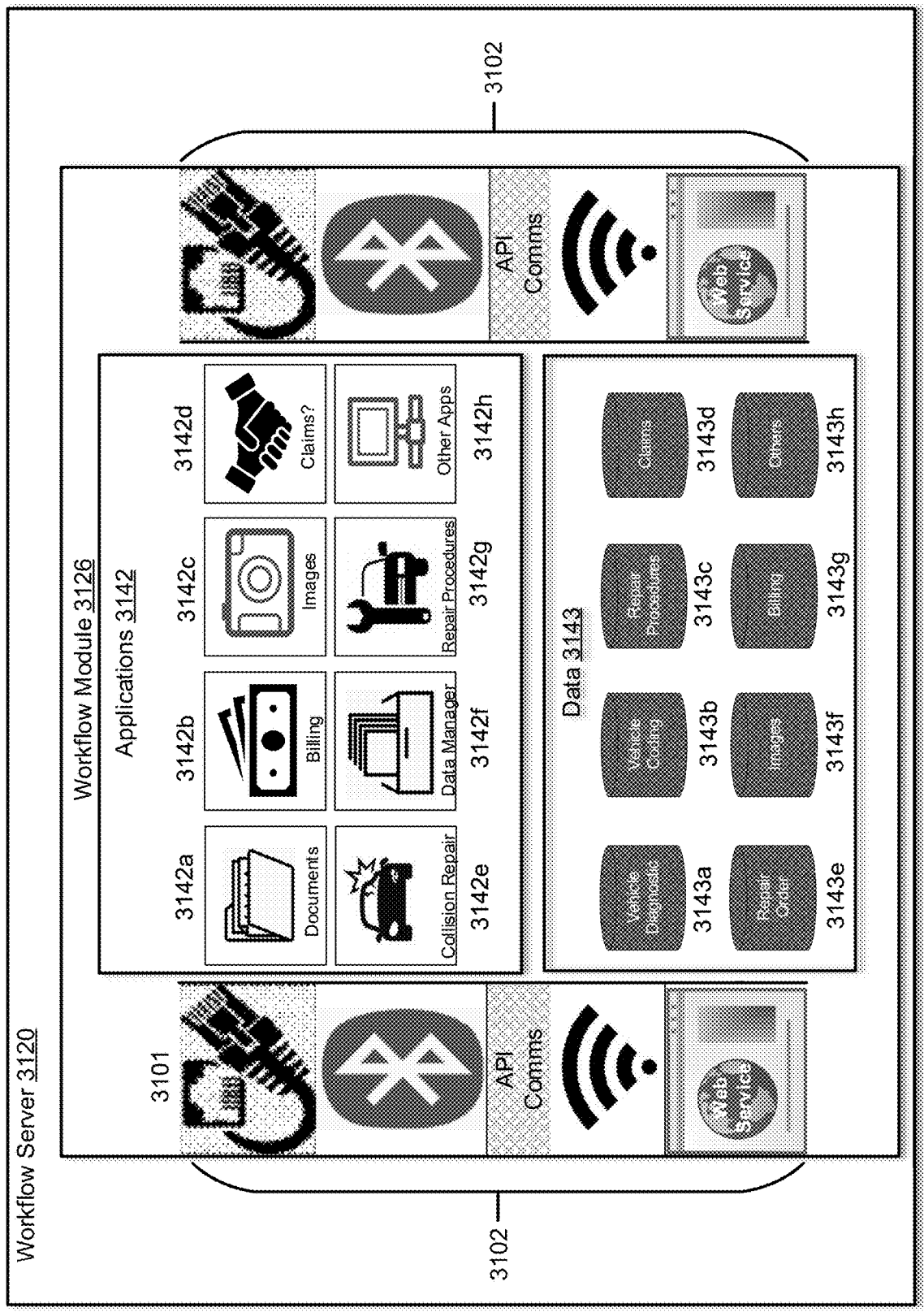
FIG. 3 illustrates an example workflow server including a workflow module of the example environment of FIG. 1, according to an implementation of the disclosure.

For example, FIG. 3 illustrates an example workflow module 3126 (i.e., workflow 126 module illustrated in FIG. 1) of workflow server 3120 (i.e., workflow server 120 illustrated in FIG. 1), configured in accordance with one embodiment. Workflow module 3126 may include database 3143 (i.e., database 122 illustrated in FIG. 1).

In some embodiments, database 3143 may include one or more specialized databases 3143a-h to facilitate the data management associated with the optimized collision repair process, as described herein. For example, workflow module 3126 may include a vehicle diagnostic database 3143a configured to store diagnostic and/or repair log data received from the diagnostic scan tool. As explained above, the data captured by the scan tool may include Pre- and Post-Scan reports, code resets, reprogramming and recalibrations information, diagnostic repairs and/or other vehicle data.

In some embodiments, workflow module 3126 may include a vehicle configuration database 3143b configured to store VIN, vehicle year/make/model, and the detailed list of installed vehicle components based on the option and trim packages included on the specific vehicle.

In some embodiments, workflow module 3126 may include a repair procedure database 3143c configured to store repair procedure data received for the specific vehicle being repaired upon specifically requesting this data, for example, from the manufacturer. The repair procedure data may include wiring diagrams, standard repair times, and other such similar repair procedure information. Repair procedure database 3143c may be populated by one or more processes of workflow module 3126. In particular, workflow module 3126 may establish a connection to an OEM or AM repair database, locate and download only the specific repair procedure data (e.g., repair guide) needed for a particular vehicle and only for the identified repairs. For example, relevant data may be located using the VIN.

For any given repair there are typically thousands of available repair procedures many of which don't relate to the specific damage to the vehicle being repaired. Relevant repair procedures to a specific repair may be identified by a user. That way, any user requesting repair procedures will avoid repeating the task resulting in significant time and cost savings. Alternatively, DTCs from the scan reports may be used to systematically find and surface any repair procedure that are related to that DTC, again reducing research time. Finally, the scan tool can may identify which optional equipment is installed in the vehicle, thus further assisting in finding the repair procedures for installed safety systems, and eliminating those repair procedures that involve equipment that is not installed on the subject vehicle.

In some embodiments, relevant repair procedure data stored in repair procedure database 3143c may be populated by utilizing DTCs obtained during a pre-scan. By virtue of receiving and storing only specific, on-demand repair procedure data, results in a reduced data flow and lowers the strain on the network resources. Additionally, a reduced data set provides obvious data storage benefits.

In addition to manually identifying relevant repair procedures, DTCs generated during the pre-scan by the scan tool (e.g., scan tool 104 illustrated in FIG. 1 or scan tool illustrated in FIGS. 2A-2B) may be utilized to identify those procedures that are particularly relevant to the damage indicated by the DTCs. Finally, the scan tool can identify optional equipment that may be installed in the vehicle. Similarly, the scan tool can also identify if particular equipment is not installed or missing form the subject vehicle. By virtue of identifying optional equipment, results in requesting repair procedures related to that equipment while eliminating repair procedures related to equipment that is not installed on the subject.

In some embodiments, the workflow module 3126 may be integrated with an intelligent database of vehicle diagnostic data which is comprised of DTC codes by vehicle make/model and an indicator of whether each DTC code is of a type that cannot be caused by or is not related to a collision event. For example, codes associated with evaporative emission systems are designed to report problems with emissions and are not set by collision events. This database would be maintained and enhanced over time as new models are introduced and DTC codes are more accurately designated as solely mechanical in nature and therefore unrelated to collision events.

In some embodiments, workflow module 3126 may be integrated with both the scan tool data and procedure database 3143c. Relevant repair procedures may be determined in the workflow module and then integrated with the claims or repair management system. For example, the repair procedures become part of the electronic file folder for the repair. By eliminating the non-relevant repair procedures results in a more usable and manageable set of repair procedure. For example, repair technicians and Quality Assurance personnel no longer have to research and sort through voluminous procedure database to locate relevant repair procedures. The associations between relevant repair procedures and the repair file are stored as a record and may be used to trace back particular procedures actually followed during the repair process. By virtue of storing which repair procedures were utilized reduces potential liability exposure and allows to more effectively manage repairs in the future.

Furthermore, by utilizing data integration in the repair workflow module, allows the system to analyze various inputs simultaneously to determine if proper procedures were followed, and if only damage related to the claim incident was repaired.

In some embodiments, workflow module 3126 may include an insurance claim database 3143d configured to receive and store claim data from an insurance company.

For example, claim data may indicate that the point of impact was at or near the rear bumper. The system can then parse vehicle damage and determine that a front bumper sensor DTC was unrelated to the insurance claim accident event. The date of loss of the accident might show as May 1, 2020 in the insurance claims data. Scan tool data may show an airbag system fault that was set on Feb. 12, 2020. Since this fault code predates the accident, it is therefore 'unrelated damage' and while it should be fixed, it is not the insurers responsibility to pay for the repair. This feature can save insurers million per year in paying for unrelated damage claims.

In some embodiments, workflow module 3126 may include a repair order database 3143e configured to receive and store repair procedure information. The repair procedure information may include data related to one or more repair procedures and the order in which they must be performed by the repair technician to ensure proper collision repair. In some embodiments, the repair procedure information may be accessed and viewed by the repair technician via the diagnostic scan tool.

Repair procedures can be related to all types of repair information, some of which is diagnostic/electronic and some is mechanical or other. For example, a repair procedure may be calling for calibration of the lane departure system with the bumper cover off. This means that the calibration must be complete before the vehicle goes to final assembly and the bumper cover is reattached. However, a repair technician may be unaware that this calibration procedure requires the bumper cover being off the vehicle and may only become aware after the vehicle has been fully reassembled, resulting in unnecessary delays and potential damage (e.g., a freshly painted bumper being removed to perform the calibration, which may damage the paint). By utilizing an enhanced scan tool as described here, the repair technician is able to view all the repair procedures that are related to the DTC codes found by the scan tool prior to the start of repairs on the vehicle.

In other embodiments, a scan tool may be used to present notifications to the user that remind the user to perform particular recalibration procedures when recalibration parameter is met. For example, a repair procedure may require that a vehicle that sustained a front collision damage must undergo recalibration of lane departure sensor. A scan tool may be used to present a notification to the user reminding them to recalibrate the lane departure sensor during the post-scan process. By virtue of reminding the technician to perform the necessary calibrations allows the technician to execute all repair procedures correctly, thereby increasing customer satisfaction, safety, and reducing cost and exposure to liability. Alternatively, without such notification, it is possible that the vehicle would be delivered not in a fully functioning state.

The estimator can use annotation to make notes while tagging a relevant repair procedure to the job. For example, the repair procedure says that repairing the bumper with plastic filler is not allowed since there are radar/lidar sensors behind the bumper cover. He can add a note to the technician to check for bumper damage and if found, do NOT repair it, but rather replace the bumper cover.

By using the connectivity between the diagnostic scan tool 104 and the other claims, estimating and repair management systems in use, allows workflow module 3126 to be configured to annotate repair procedure data to support communication regarding the repair plan amongst the various parties involved in the repair and claims process. The annotation may increase the likelihood of correct repairs being performed on the vehicle, which in turns ensures vehicle and passenger safety and lowers liability risks.

In some embodiments, workflow module 3126 may include an image database 3143*f* configured to receive and store image data (e.g., images of collision damage) received for example from an estimator. The images may be used to determine and/or confirm whether a particular damaged panel is related to a particular collision event. In some embodiments, a repair technician may use the diagnostic scan tool (e.g., a scan tool configured to operate with an image capture device) to collect and annotate images during the repair process. For example, an estimator may have included a damaged panel as part of an insurance claim. During a repair process, technician may determine and/or identify significant rust inside the damaged panel (e.g., upon removing particular panels) and capture an image of the rust including annotations. Subsequently, the image taken by the technician may be used (in conjunction with the date of loss in the insurance claims data in workflow module 3126) to determine that the damaged panel should not be included in the insurance claim since the rust indicates that type of damage to be inconsistent with damage caused a week ago on the date of loss.

In some embodiments, this process is automatic. For example when a DTC was set weeks prior to the date of loss on the claim then the issue is automatically determined to be 'unrelated' by the system described in the invention. In other embodiments, (such as the image processing of rust cited on a dented panel here), the system provides documentary evidence that enables a repair estimator or insurance adjuster to determine that the damage is 'unrelated'.

Annotation can also be done automatically using computer vision. For example, computer vision may be used to identify damaged panel and determine damage type. Additionally, the use of computer vision may help automate and speed up the process of damage evaluation. Finally, the system can be enhanced with Artificial Intelligence (AI) Image Processing that may automate the identification of damage (e.g., rust) and then make an automatic determination whether the damage was unrelated to the loss event.

In other embodiments, images captured by the scan tool during a post-scan may be used to collect data confirming that OEM procedures were followed during repair process. For example, a repair procedure related to a rail sectioning/welding procedure was identified as relevant and annotated in the workflow. The scan tool may be used by a technician to capture image(s) related to the welded rail demonstrating it was repaired in accordance with OEM procedures.

In some embodiments, workflow module 3126 may include a billing database 3143*g* configured to store information related to repair payments. For example, payment information may include billing profile data, final bills issued by repairer, which may be subsequently viewed by the insurer.

In some embodiments, workflow module 3126 may include other databases 3143*h* configured to store other data, such as various communications related to the repair process. For example, other data may include communications between the repair technician, staff, customer, and insurance agent.

In yet other embodiments, databases 3143 may include one or more database configured to store machine learning data, and/or other information used by workflow server 120.

In some embodiments, workflow module 3126 may include several applications 3142 to enable the workflow module to perform the operations and functions described in this disclosure. For example, a document management application 3142*a* may be provided to format reports, index documents, and/or editing, viewing, or printing documents. A billing and payment application 3142*b* may be provided to manage billing profiles, check to ensure that scan operations match with the billing profile and process, etc. An image processing application 3142 c may be provided to capture, annotate and communicate/transfer images. A claims application 3142*d* and a collision repair application 3142*e* may be provided to process insurance claim data, repair planning communications data (e.g., via SMS or email), repair issues, supplemental documentations and requests, process diagnostic data received from the enhanced scan tool, etc. A data manager application 3142*f* may be provided to cross reference scan tool data to existing claims and repairs via VIN match, year/make/model of the vehicle, etc., index data by vehicle VIN, repair order number, claim number, technician ID, etc. A repair procedure application 3142g may be provided to process repair procedure data received from the automotive manufacturers, car information systems, etc. Other suitable applications 3142g, such as applications supporting communications (SMS, email, etc.) may be provided as well.

Thus, in some embodiments, the system disclosed herein, allows the Workflow module to monitor and record in real time diagnostic scanning activity (e.g., Pre-scan and Post-Scan) and/or diagnostic repair log data performed by the technician with the diagnostic scan tool. This data is then processed, stored, used as the basis for generating new data and streamlined to various entities involved in the vehicle collision repair process. Again, this data flow architecture, as described herein, ensures that fewer network resources are used in the collision repair process and associated claim processes, while increasing vehicle safety, by for example documenting that all necessary repairs were done properly, and thus preventing or at least reducing errors and/or fraud.

The enhanced access to data in real-time and near real-time enabled by workflow module 3126 supports more accurate and timely decisions on vehicle repair, billing, and claims processing which enables proper repairs and also improved repair facility billing processes, and streamlined claims processing. For example, by using diagnostic data, OEM repair procedures, and images of the damage, results in the insurer to determine if the claim is properly adjusted at in a more efficient manner. That is, without the relevant procedures identified, the adjuster might have erroneously determined that the bumper cover could have been repaired and therefore disputed the repair facility estimate. By contrast, by using the relevant procedures allows the adjuster to determine whether a repair procedure may prohibit the repair of the cover due to lidar/radar sensors being located behind it and, adjust the claim faster.

In some embodiments, workflow module 3126 may utilize one or more tables configured to store data related to repair estimate data maintained by the collision repair entity or the automotive insurer. For example, operations code table may be an extension of or addition to a parts/labor code table on the repair shop's management or estimating system, or the operations code table may be a standalone table to support workflow module 3126.

In some embodiments, the operations code table may store standard rates for diagnostic repair operations, as well as custom payment profiles for various payers (e.g. Insurance company, insurance claims office, fleet customer, wholesale account, etc.).

In some embodiments, the operations code table may store various categories of specific repair operations, their descriptions, and their associated billing rates which may be expressed as (a) a rate of time spent by the technician (e.g., billed at the repair shop's agreed rate for mechanical labor), (b) rate based on a fixed amount of time (e.g. one hour at the shop's body labor rate), and/or (c) flat rate per operation (e.g., $25 per module reset).

In some embodiments, the operations code table may allow the repair organization to quickly and accurately bill the party paying for repairs and to supply backup documentation to support the billing. In some embodiments, workflow module 3126, in conjunction with the operations code table, may automatically generate new billing lines for the repair order that included both the description of the operation and the price from the operations code table. In some embodiments, these new billing lines could be passed to the repair shop's systems as a Standardized Transaction (e.g., CIECA (Collision Industry Electronic Commerce Association) BMS (new format) or EMS (old format, etc.).

API

In some embodiments, workflow module 3126 may include a method for exchanging data between workflow module 3126 and various systems utilized in the collision repair, billing, and automotive claims processes described herein. In some embodiments, the implementation of the systems and methods described herein may include the publication of a Software Developers Kit (SDK) and/or an Application Programming Interface (API) (e.g., 3102) that will allow for application developers and data providers to implement Interfaces among the various components of the systems. The API data exchange may be accomplished using Standardized Transactions (e.g., CIECA BMS transactions, etc.) or may be by using other published or custom data formats.

For example, API 3102 may be integrated with OEM and other third party repair procedure data providers to allow technician access to repair procedures via the diagnostic scan tool during the course of repairs, as described herein. This could include both repair procedure data from the vehicle manufacturer (e.g., Toyota, Honda, Ford, G/M, etc.) and third party sources (e.g., I-CAR, ETI, AllData, etc.). This integration with both workflow module 3126 and the diagnostic scan tool allows for multiple parties involved in the repair and claims workflow to view, attach, and annotate repair procedure data specific to the repair event and to interact with one-another, in real-time or nearly in real time, which provides substantial advantages over existing tools (e.g., accuracy of repair for safety purposes).

As the workflow module is server based and contains images, diagnostic data, OEM repair procedures and annotations by various involved parties, it facilitates decisions regarding claims payment and assurance that safety systems are being properly repaired. So rather than an adjuster having to come out and look at the repair in process, he can access online data in the workflow module and quickly approve payment or adjust the claim.

As another example, integration may be provided via API 3102 with other collision information systems, which may or may not be in use at the collision repair facility, including the repair facility's estimating system and other systems in use by the repair facility for management. In some embodiments, API 3102 may be utilized for data exchange with vehicle OEMs, insurers claims management systems, parts manufacturers and suppliers, and other entities involved in the automotive collision and claims processes.

Advantages of this architecture include enhanced decision making during the repair and claims process based on real-time or near real-time access to data which is indexed and cross referenced by workflow module 3126 using methods not previously available. An example of this is that a collision facility estimator when developing the repair estimate accessed a vehicle repair procedure that indicated a special battery disconnect procedure was necessary. The estimator would append this vehicle repair procedure to the workflow module 3126 data record for this vehicle along with an annotation directing the technician to review the battery procedure prior to initiating the repair. The repair technician using the diagnostic scan tool may be alerted upon start of repairs of the subject vehicle of the estimator's annotation, can review the vehicle repair procedure on the diagnostic scan tool and thereby avoid causing additional work necessitated by an incorrect battery disconnection.

Method

Figure 4A:
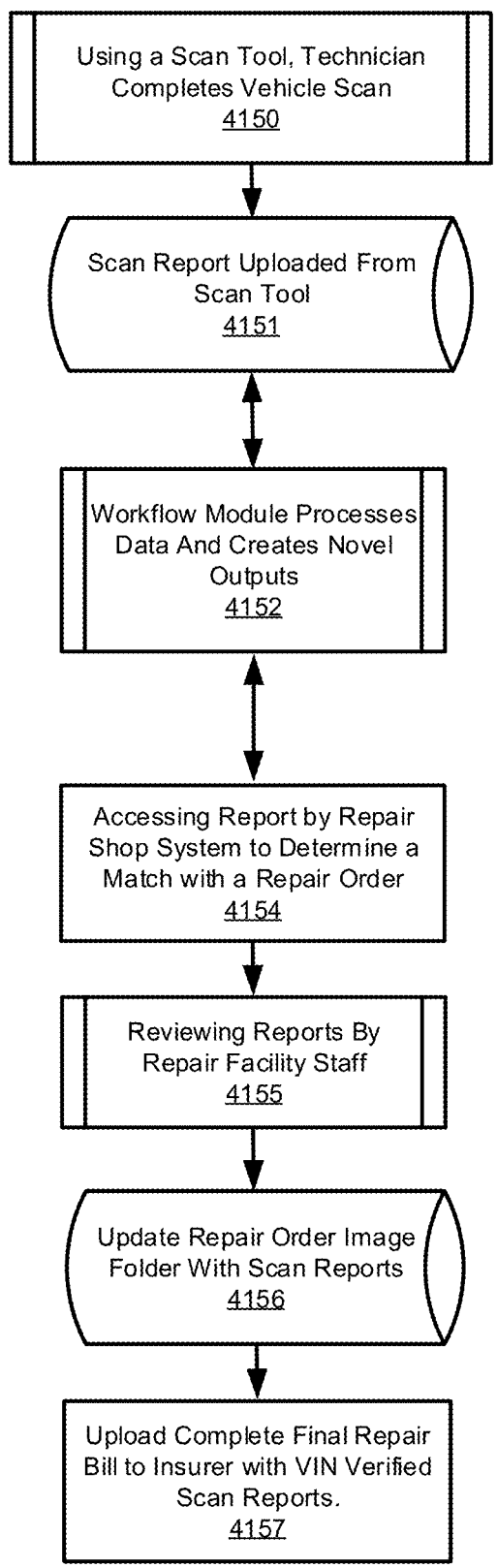
FIG. 4A illustrates an example process performed by the workflow module, according to an implementation of the disclosure.

FIG. 4A illustrates an example operation of the workflow module 3126 depicting an example of a basic process of use of the disclosed system by a collision repair facility.

At operation 4150, a repair technician may use the diagnostic scan tool to complete a vehicle diagnostic scan. That is, the technician may be completing the Post-Scan. As described hereinbefore, the technician may also be completing a Pre-Scan before the repairs begin and also connect the diagnostic scan tool to capture diagnostic repair information.

At operation 4151, the Post-Scan report (as well as the Pre-Scan report and work reports captured during diagnostic repairs) may then be uploaded to the workflow module. As described hereinbefore, API (e.g., API 3102) may be provided to enable data communication among the workflow module, diagnostic scan tool, repair facility network and third parties' networks (e.g., insurers, vehicle manufacturers, claim management services, etc.).

At operation 4152, the Workflow Module may process the data received from the diagnostic scan tool, and may create novel data outputs and reports. In some embodiments, a new output may include a Post-Scan report. The Post-Scan report may include information such as related to the modules accessed during the scan, the modules that could have been installed on the vehicle but were not found, the diagnostic trouble codes (DTCs) reported by the modules, the year/make/model of the vehicle, and the vehicle mileage, and other similar information that may be generated by listing which Diagnostic Trouble Codes (DTC's) are likely related, likely unrelated, or definitely unrelated to the collision event and/or pre-date the collision event.

Figure 4B:
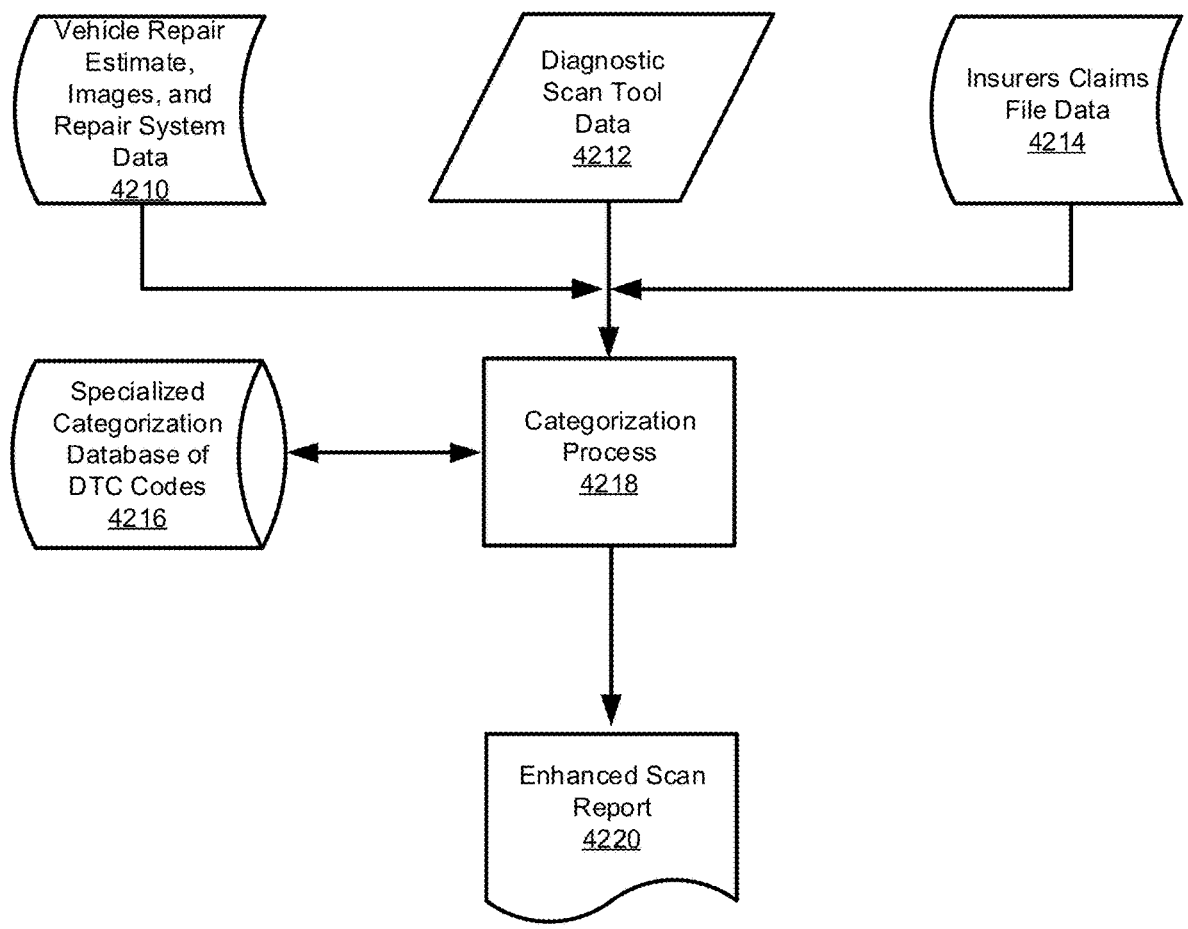
FIG. 4B illustrates a schematic of the workflow module configured to categorize DTCs, according to an implementation of the disclosure.

For example, as illustrated in FIG. 4B, the workflow module may perform a categorization process 4218 configured to categorize individual DTCs by analyzing data collected from a variety of sources. For example, the DTCs may analyze vehicle repair estimate, images, and repair system data 4210, diagnostic scan tool data 4212, insurers claims filed data 4212 in order to generate an enhanced scan report 4220. In some embodiments, data from specialized categorization database of DTC codes 4216 may be used during the categorization process 4218. Upon performing the categorization, the workflow module may be configured to regenerate an enhance scan report 4220 listing the one of three categories for each DTC.

In some embodiments, the categorization of individual DTCs may performed by a variety of methods, including, for example, comparing a date that a DTC was set with the date of the collision incident, and by comparing each DTC to a proprietary table that bifurcates those that may be caused by a collision event to those that are either never or highly unlikely to be caused by a collision event. In some embodiments, a machine learning algorithm may be used to categorize individual DTCs. For example, a process utilizing machine learning may include a machine learning model, for example, trained on similar historical repair data that includes categorized DTCs pertaining to particular collision event. The machine learning algorithm may determine the likelihood that a reported DTC was caused by the claimed collision event.

Figure 4C:
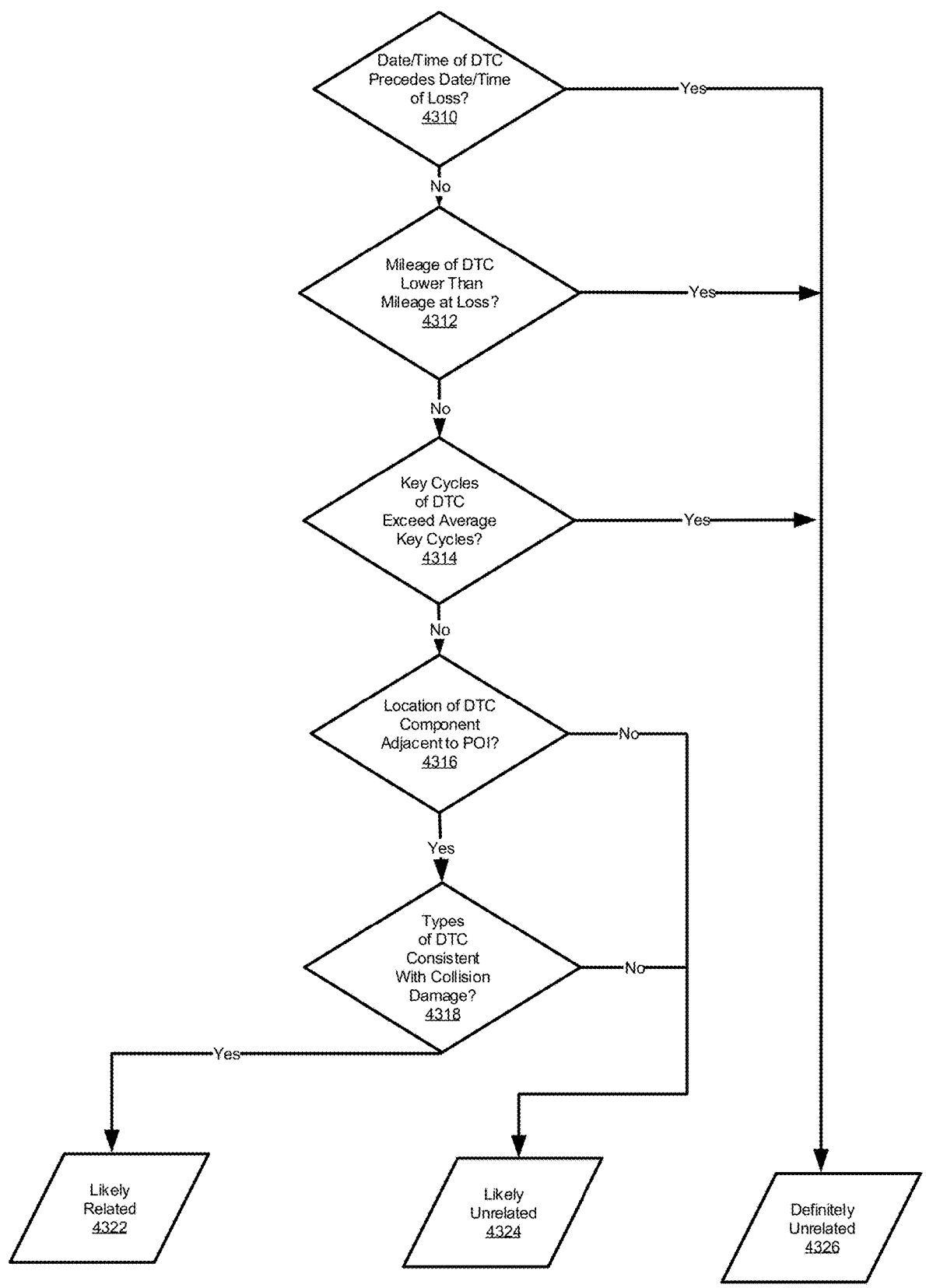
FIG. 4C illustrates an example categorization process, according to an implementation of the disclosure

In some embodiments, the process of determining one of three categories for each DTC may include operations illustrated in FIG. 4C. At operation 4310, the date and time associated with the DTC loss may be compared to the date and time of the incident. Upon determining that the date and time associated with the DTC precede the date and time of the incident, the workflow module may determine that the DTC is definitely unrelated, as indicated by operation 4326.

Alternatively, upon determining that the date and time associated with the DTC does not precede the date and time of the incident, the workflow module may proceed to operation 4312.

At operation 4312, the mileage of the vehicle at the time of DTC may be compared to the mileage of the vehicle at the time of the incident. Upon determining that the mileage associated with the DTC is lower the mileage of the incident, the workflow module may determine that the DTC is definitely unrelated, as indicated by operation 4326. Alternatively, upon determining that mileage associated with the DTC is not lower than the mileage at the time of the incident, the workflow module may proceed to operation 4314.

At operation 4314, the key cycles of the vehicle at the time of DTC may be compared to the number of vehicle key cycles that have occurred since the collision event. Upon determining that the key cycles associated with the DTC exceed the vehicle's key cycles since the collision event, the workflow module may determine that the DTC is definitely unrelated, as indicated by operation 4326. Alternatively, upon determining that the key cycles associated with the DTC do not exceed the key cycles since the collision, the workflow module may proceed to operation 4316. That is, key cycle information may have probative value in assessing relationship to a collision event. For example, some modules do not report the date/time of a DTC, rather they report how many key cycles have occurred since the DTC was set. In particular, if the collision event occurred a few days ago and the vehicle was towed to the repair shop, one could assume that a DTC showing more than a few key cycles ago predates the accident event.

At operation 4316, the location of vehicle system reporting the DTC with respect to the point of impact (POI) (e.g., location of the collision damage) may be evaluated. Upon determining that the DTC system is not located adjacent to the POI, the workflow module may determine that the DTC is likely unrelated, as indicated by operation 4324. Alternatively, upon determining that DTC system is located adjacent or near to the POI, the workflow module may proceed to operation 4318. For example, a DTC related to a front bumper sensor on a collision event where the point of impact was the rear bumper would indicate that the DTC was unrelated to the accident. Similarly, DTCs for infotainment systems, which are located in the dashboard of a vehicle would also be highly unlikely to have been caused by a light rear end collision. Accordingly, the POI and the severity of the collision can be used to determine if a DTC was unrelated or likely unrelated to the collision event.

For example, a DTC related to a front bumper sensor on a collision event where the point of impact was the rear bumper would indicate that the DTC was unrelated to the accident. DTC's for infotainment systems located in the dash of the vehicle would also be highly unlikely to be caused by a light rear end collision. So the point of impact and the severity of the collision can be used to help the workflow module determine if a DTC was unrelated or likely unrelated to the collision event.

At operation 4318, the DTC may be compared to the types of DTC known to be associated with collision damage. Upon determining that the DTC type is not consistent with collision damage, the workflow module may determine that the DTC is likely unrelated, as indicated by operation 4324. Alternatively, upon determining that DTC is associated with collision damage, the workflow module may determine that the DTC is likely related, as indicated by operation 4324.

By performing the categorization of each DTC, allows the workflow module to increase the accuracy of determining prior damages on vehicle through the use of vehicle diagnostic data and a specialized database of DTC categories. By virtue of having more accurate determination with respect to the DTC, results in significant time savings for field adjusters, savings for insurers, enhanced claim settlement accuracy based only on damage related to the claim collision event, and a reduction in indemnity payments. Additional benefits include increase in insurer profits, which in turn translates to lower consumer cots. Finally, by virtue of categorizing particular DTCs as "definitely unrelated" results in a more streamlined communication between the insurer and the collision repairer. For example, by applying a standardized process when categorizing the DTCs, reduces potential opportunity for conflict and controversy as to whether or not certain vehicle repairs are related to the collision event and therefore covered by the insurer. This can reduce friction between insurer staff and repair facility staff other interested parties including the vehicle owner.

As alluded to above, after the DTCs have been categorized, the workflow module may be configured to regenerate an enhance scan report 4220 listing the one of three categories for each DTC. The report is configured to inform the users (e.g., insurance company personnel, repair facility staff, vehicle owner) which DTCs are definitely unrelated to the collision claim and which are likely unrelated and likely related. By separating the definitely unrelated DTCs from likely related and likely unrelated, reduces the total number of DTC that may still require further review before making a final determination. Additionally, the DTCs that are likely unrelated may not be as closely reviewed as the likely related DTCs, thereby reducing the effort necessary to establish the final determination even further. This elimination of unrelated DTCs provides the auto insurer assurance that only the repairs associated with DTC related to the incident were repaired as part of the claim payment.

In some embodiments, the workflow module at this time may also process data received from the diagnostic scan tool to create repair or work logs of diagnostic repair operations completed during the repair process (repair log data) using the diagnostic scan tool. Examples of data that may be included on the work log would be date/time stamped entries for start and stop times for performing an ADAS (Advanced Driver Assistance Systems) system recalibration, or for resetting the seat weight sensor in the passenger seat. This work log, together with the other reports (Pre-scan, Post-scan) may be used to evaluate whether the vehicle was properly repaired and is thus safe to drive. These reports may also be used to support billing the insurance carrier for these operations.

At operation 4154, after being notified by the workflow module, the repair facility's system may access the new reports and match them with the repair order. At operation 4155, the repair facility staff may optionally review the scan reports and/or the new reports provided by the workflow module. At operation 4156, the repair order file may next be updated with the scan reports and/or the new reports generated by the workflow module. For example, the repair order file may be stored in the repair facility's network and the update would occur after an instruction was received from the workflow module. Finally, at operation 4157, a complete final repair bill may be generated based on the scan reports generated by the workflow module and the final bill may then be uploaded to insurer's system with VIN verified scan reports.

Figure 5:
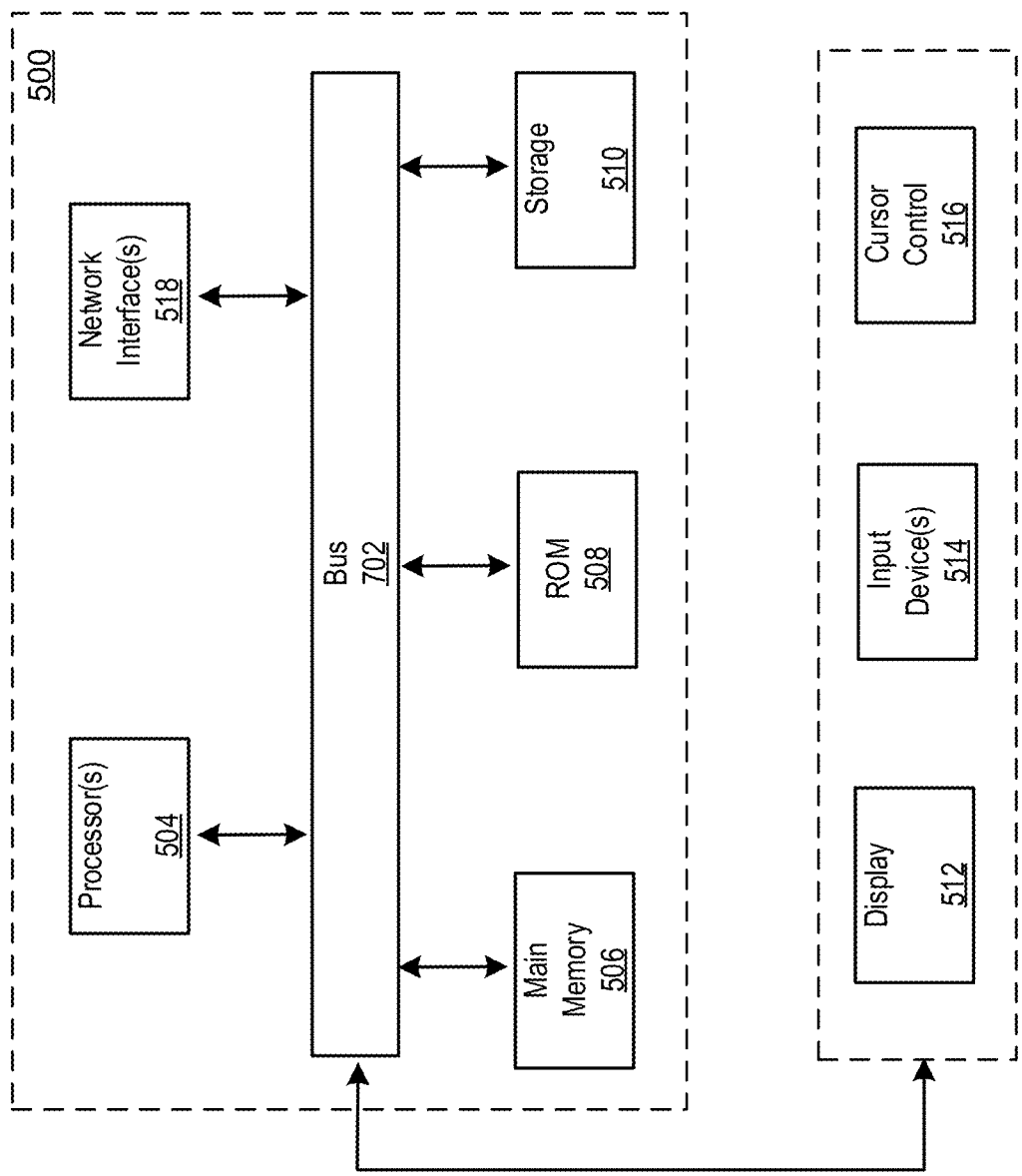
FIG. 5 illustrates an example computing system that may be used in implementing various features of embodiments of the disclosed technology.

It should be noted that the disclosed system offers unique advantages over existing systems, processes and methods. For example, the system provides a method to document the diagnostic condition of the vehicle before (Pre-Scan), during and after (Post Scan) repairs and to capture and document scan tool repair procedures executed on the vehicle in a manner that does not require manual intervention. Additionally, the system applies a standardized a standardized process when categorizing the DTCs, and eliminate likely unrelated and definitely unrelated DTCs, thereby lowering the likelihood of the insurance payer paying for an unrelated repair.

Where circuits are implemented in whole or in part using software, in one embodiment, these software elements can be implemented to operate with a computing or processing system capable of carrying out the functionality described with respect thereto. One such example computing system is shown in FIG. 5. Various embodiments are described in terms of this example-computing system 500. After reading this description, it will become apparent to a person skilled in the relevant art how to implement the technology using other computing systems or architectures.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a transparent heads-up display (HUD) or an optical head-mounted display (OHMD), for displaying information to a computer user. An input device 514, including a microphone, is coupled to bus 502 for communicating information and command selections to processor 504. An output device 516, including a speaker, is coupled to bus 502 for communicating instructions and messages to processor 504.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 505. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 505. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A system, comprising:
a hardware processor; and
a non-transitory machine-readable storage medium encoded with instructions executable by the hardware processor to perform operations comprising:
receiving one a repair diagnostic trouble code (DTC), the DTC specifying diagnostic information related to a component in a vehicle which has experienced a collision event, and the diagnostic information comprising one or more data inputs generated by the component in the vehicle;

generating a repair estimate for the vehicle for the collision event to include the DTC;
generating a set of input data comprising the DTC and at least one of: the repair estimate, an image of the vehicle following the collision event, and an insurance claim for the collision event;
applying the set of input data as an input to a trained machine learning model, wherein the trained machine learning model has been trained using historical examples of the set of input data, wherein responsive to the input, the trained machine learning model outputs a likelihood that the DTC was caused by the collision event;
determining a vehicle make/model of the vehicle;
determining that the DTC is present in a list of DTCs that are known to not be caused by collision events by utilizing a lookup function on a database filterable by vehicle makes/models that stores the list of DTCs and filtering the list of DTCs to include only those with a same vehicle make/model as the vehicle;
determining that the DTC is unrelated to the collision event when the likelihood that the DTC was caused by the collision event is below a preset threshold likelihood based on the trained machine learning model output and the DTC is present in the list of DTCs that are known to not be caused by collision events when utilizing the lookup function on the database;
when the DTC is determined to be unrelated to the collision event, removing the DTC from the repair estimate; and
outputting the repair estimate to an insurer claims management system.

2. The system of claim 1, wherein the one or more data inputs comprise at least one of: a DTC date and time information, a DTC vehicle mileage information, a number of DTC key cycles, a location of the component in the vehicle, and a DTC type.

3. The system of claim 2, wherein determining whether that the DTC is unrelated to the collision event further comprises at least one of:
comparing the DTC date and time information to a collision event date and time;
comparing the DTC vehicle mileage information to a collision event vehicle mileage; and
comparing the number of DTC key cycles to a number of vehicle key cycles that have occurred since the collision event.

4. The system of claim 3, wherein the DTC date and time information precedes the collision event date and time information, the DTC vehicle mileage information is lower than the collision event vehicle mileage information, and/or the number of DTC key cycles exceeds the number of vehicle key cycles that have occurred since the collision event.

5. A non-transitory machine-readable storage medium encoded with instructions executable by a hardware processor of a computing component, the machine-readable storage medium comprising instructions to cause the hardware processor to perform operations comprising:
receiving a repair diagnostic trouble code (DTC) of a type that is caused by mechanical component malfunction, the DTC specifying diagnostic information related to a component in a vehicle which has experienced a collision event, and the diagnostic information comprising one or more data inputs generated by the component in the vehicle;
generating a repair estimate for the vehicle for the collision event to include the DTC;
generating a set of input data comprising the DTC and at least one of: the repair estimate, an image of the vehicle following the collision event, and an insurance claim for the collision event;
applying the set of input data as an input to a trained machine learning model, wherein the trained machine learning model has been trained using historical examples of the set of input data, wherein responsive to the input, the trained machine learning model outputs a likelihood that the DTC was caused by the collision event;
determining a vehicle make/model of the vehicle;
determining whether the DTC is present in a list of DTCs that are known to not be caused by collision events by utilizing a lookup function on a database filterable by vehicle makes/models that stores the list of DTCs and filtering the list of DTCs to include only those with a same vehicle make/model as the vehicle;
determining that the DTC is unrelated to the collision event when the likelihood that the DTC was caused by the collision event is below a preset threshold likelihood based on the trained machine learning model output and the DTC is present in the list of DTCs that are known to not be caused by collision events when utilizing the lookup function on the database;
when the DTC is determined to be unrelated to the collision event, removing the DTC from the repair estimate; and
outputting the repair estimate to an insurer claims management system.

6. The non-transitory machine-readable storage medium of claim 5, wherein the one or more data inputs comprise at least one of: a DTC date and time information, a DTC vehicle mileage information, a number of DTC key cycles, a location of the component in the vehicle, and a DTC type.

7. The non-transitory machine-readable storage medium of claim 6, wherein determining that the DTC is unrelated to the collision event further comprises at least one of:
comparing the DTC date and time information to a collision event date and time;
comparing the DTC vehicle mileage information to a collision event vehicle mileage; and
comparing the number of DTC key cycles to a number of vehicle key cycles that have occurred since the collision event.

8. The non-transitory machine-readable storage medium of claim 7, wherein the DTC date and time information precedes the collision event date and time information, the DTC vehicle mileage information is less than the collision event vehicle mileage information, and/or the number of DTC key cycles exceeds the number of vehicle key cycles since the collision event.

9. A method implemented by a server computer, the method comprising:
receiving a repair diagnostic trouble code (DTC), the DTC specifying diagnostic information related to a component in a vehicle which has experienced a collision event, and the diagnostic information comprising one or more data inputs generated by the component in the vehicle;
generating a repair estimate for the vehicle for the collision event to include the DTC;

generating a set of input data comprising the DTC and at least one of: the repair estimate, an image of the vehicle following the collision event, and an insurance claim for the collision event;

applying the set of input data as an input to a trained machine learning model, wherein the trained machine learning model has been trained using historical examples of the set of input data, wherein responsive to the input, the trained machine learning model outputs a likelihood that the DTC was caused by the collision event;

determining a vehicle make/model of the vehicle;

determining whether the DTC is present in a list of DTCs that are known to not be caused by collision events by utilizing a lookup function on a database filterable by vehicle makes/models that stores the list of DTCs and filtering the list of DTCs to include only those with a same vehicle make/model as the vehicle;

determining that the DTC is unrelated to the collision event when the likelihood that the DTC was caused by the collision event is below a preset threshold likelihood based on the trained machine learning model output and the DTC is present in the list of DTCs that are known to not be caused by collision events when utilizing the lookup function on the database;

when the DTC is determined to be unrelated to the collision event, removing the DTC from the repair estimate; and outputting the repair estimate to an insurer claims management system.

10. The method of claim 9, wherein the one or more data inputs comprise at least one of: a DTC date and time information, a DTC vehicle mileage information, a number of DTC key cycles, a location of the component in the vehicle, and a DTC type.

11. The method of claim 10, wherein determining that the DTC is unrelated to the collision event further comprises at least one of:
comparing the DTC date and time information to a collision event date and time;
comparing the DTC vehicle mileage information to a collision event vehicle mileage; and
comparing the number of DTC key cycles to a number of vehicle key cycles that have occurred since the collision event.

12. The method of claim 11, wherein the DTC date and time information precedes the collision event date and time information, the DTC vehicle mileage information is less than the collision event vehicle mileage information, and/or the number of DTC key cycles is greater than the vehicle key cycles since the collision event.

* * * * *

UNITED STATES PATENT AND TRADEMARK OFFICE
CERTIFICATE OF CORRECTION

PATENT NO. : 11,961,341 B2
APPLICATION NO. : 16/922927
DATED : April 16, 2024
INVENTOR(S) : John J. Rozint et al.

It is certified that error appears in the above-identified patent and that said Letters Patent is hereby corrected as shown below:

In the Claims

Column 25, Line 39 (Claim 3, Line 1) that reads "The system of claim 2, wherein determining whether-that" should read -- The system of claim 2, wherein determining that --

Signed and Sealed this
Fourth Day of June, 2024

Katherine Kelly Vidal
*Director of the United States Patent and Trademark Office*